(12) United States Patent
Gerber-Papin et al.

(10) Patent No.: US 10,501,099 B2
(45) Date of Patent: *Dec. 10, 2019

(54) RAIL VEHICLE BRAKING SYSTEM AND BRAKING METHOD FOR A RAIL VEHICLE COMPRISING SUCH A SYSTEM

(71) Applicant: FAIVELEY TRANSPORT AMIENS, Amiens (FR)

(72) Inventors: Denis Gerber-Papin, l'Etoile (FR); Damien Beauvois, Amiens (FR); Claudino Goncalves, Ribeaucourt (FR)

(73) Assignee: FAIVELEY TRANSPORT AMIENS, Amiens (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/947,403

(22) Filed: Apr. 6, 2018

(65) Prior Publication Data

US 2018/0222497 A1 Aug. 9, 2018

Related U.S. Application Data

(62) Division of application No. 14/571,989, filed on Dec. 16, 2014, now Pat. No. 9,956,971.

(51) Int. Cl.
*B61H 13/20* (2006.01)
*B61H 5/00* (2006.01)
(Continued)

(52) U.S. Cl.
CPC ............. *B61H 13/20* (2013.01); *B61H 5/00* (2013.01); *B61H 13/00* (2013.01);
(Continued)

(58) Field of Classification Search
CPC ..... B60T 17/086; B61H 13/20; B61H 13/005; B61H 5/00; B61H 13/00; F16D 2121/08;
(Continued)

(56) References Cited

U.S. PATENT DOCUMENTS 3,068,963 A 12/1962 Smith
3,874,747 A 4/1975 Case
(Continued)

FOREIGN PATENT DOCUMENTS

DE 2549007 A1 * 5/1977 ............. B60T 13/22
EP 1264751 12/2002
(Continued)

OTHER PUBLICATIONS

FR Search Report, dated Mar. 4, 2014, from corresponding 1357024 application.
(Continued)

*Primary Examiner* — Bradley T King
*Assistant Examiner* — Mahbubur Rashid
(74) *Attorney, Agent, or Firm* — Young & Thompson

(57) ABSTRACT

The invention concerns a rail vehicle braking system comprising a service brake having a movable piston (8) which with a body (2) of the system delimits a service brake chamber (13) supplied by a first source, a piston rod (21) disposed in that chamber and fastened to a second side (32) of the piston turned towards that chamber, and a parking brake (7) disposed in said body and comprising a blocking device (20) disposed in that chamber and movable to act on said rod, and a movable actuating device (23, 24) which is configured to be electrically actuated; said blocking and actuating devices being configured to immobilize/unblock said rod so as to block/unblock said piston in a position.

12 Claims, 11 Drawing Sheets

(51) Int. Cl.
   *B61H 13/00* (2006.01)
   *F16D 55/224* (2006.01)
   *F16D 65/18* (2006.01)
   *F16D 121/08* (2012.01)
   *F16D 127/06* (2012.01)

(52) U.S. Cl.
   CPC ....... *F16D 55/2245* (2013.01); *F16D 65/183* (2013.01); *F16D 2121/08* (2013.01); *F16D 2127/06* (2013.01)

(58) Field of Classification Search
   CPC .. F16D 2127/06; F16D 55/2245; F16D 65/18; F16D 65/183
   See application file for complete search history.

(56) References Cited

U.S. PATENT DOCUMENTS

| | | |
|---|---|---|
| 3,895,695 A | 7/1975 | Hunter |
| 4,018,140 A | 4/1977 | Engle |
| 4,116,307 A | 9/1978 | Reinecke |
| 4,596,426 A | 6/1986 | Clapp |
| 4,685,744 A | 8/1987 | Luce |
| 5,038,896 A | 8/1991 | Wirth |
| 5,701,974 A | 12/1997 | Kanjo et al. |
| 8,397,884 B2 | 3/2013 | Iraschko |
| 8,851,243 B2 | 10/2014 | Prescott et al. |
| 2005/0082126 A1* | 4/2005 | Engle .............. B60T 7/047 188/265 |
| 2008/0179144 A1 | 7/2008 | Sommerfeld |
| 2010/0044165 A1 | 2/2010 | Argirovski |
| 2010/0294601 A1 | 11/2010 | Kraus |
| 2014/0151162 A1 | 6/2014 | Mathern |
| 2014/0345987 A1 | 11/2014 | Elstorpff |

FOREIGN PATENT DOCUMENTS

| | | | |
|---|---|---|---|
| EP | 1 630 444 A2 | 3/2006 | |
| EP | 2 154 040 A1 | 2/2010 | |
| EP | 2 154 391 A1 | 2/2010 | |
| EP | 2202122 A1 * | 6/2010 | ........... B60T 15/021 |
| GB | 2469090 A | 10/2010 | |

OTHER PUBLICATIONS

Australian Examination Report, dated Jun. 29, 2019, from Australian application No. 2014277743, which corresponds to parent U.S. Pat. No. 9,956,971.

* cited by examiner

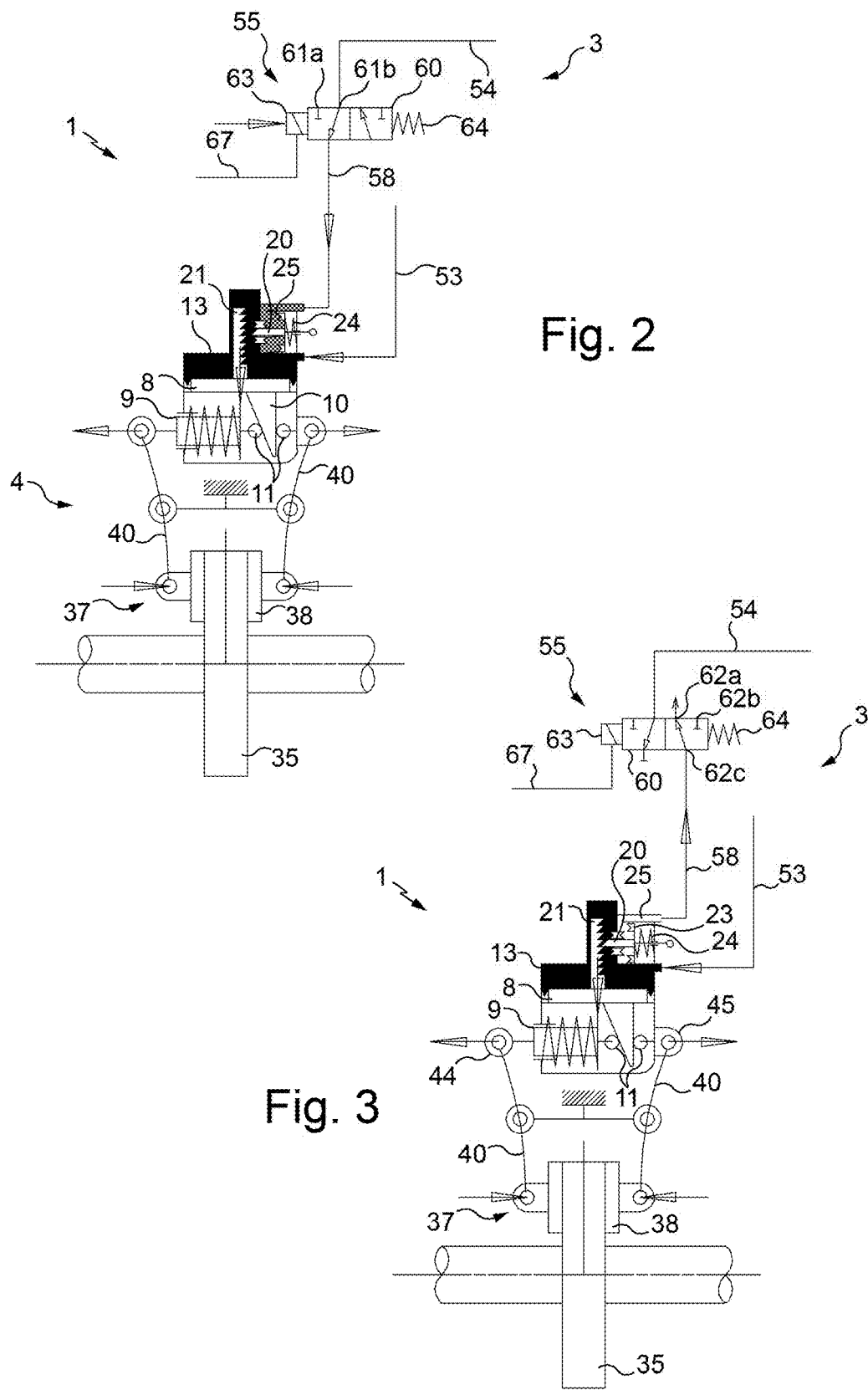

RAIL VEHICLE BRAKING SYSTEM AND BRAKING METHOD FOR A RAIL VEHICLE COMPRISING SUCH A SYSTEM

BACKGROUND OF THE INVENTION

Field of the Invention

The invention concerns the field of rail vehicle brakes.

It more particularly concerns the rail vehicle braking systems provided with a service brake and with a parking brake configured to act on a braking linkage.

It also concerns the braking methods for rail vehicles comprising such braking systems.

Description of the Related Art

Rail vehicles are generally equipped with service brake cylinders comprising a piston movable under the effect of a fluid under pressure, the movement of that piston driving a braking action such as the clamping of a disk brake between two linings, or the direct pressure of a block against a vehicle wheel.

These brake cylinders also generally comprise a parking or emergency actuator which is actuated in case of pressure loss of the fluid under pressure and/or in case of intentional venting or leakage of the pneumatic system. This actuator, also termed parking brake, makes it possible to provide braking by virtue of the load of a spring substituting for the load of the fluid. Once this parking brake has been activated, the brake remains continuously engaged.

A rail vehicle braking system is known from European patent application EP 2 154 040 which is provided with a parking brake actuator coupled to a rail service brake cylinder. This brake cylinder comprises a body and a piston which is movable relative to the body to act on the braking linkage via a thrust rod.

The brake cylinder also comprises a pressure chamber delimited by the piston and by the body and which is connected by a pipe to a source of pneumatic pressure agent to put the piston into a service braking position.

The parking brake comprises a body which is distinct from the brake cylinder body. The body of the parking brake has an opening facing the piston of the service brake cylinder, which opening slidingly receives a thrust sleeve fitting into that opening in a fluid-tight manner.

The parking brake also comprises a piston movably mounted in a cylinder attached to the body and delimiting with that body a parking brake pressure chamber. This parking brake pressure chamber is connected to another source of pneumatic pressure agent via a pipe. The piston comprises at its center an aperture passed through by the thrust sleeve.

The parking brake further comprises springs which continuously bias the piston of that parking brake towards a position referred to as low in which the parking brake is considered as being in a working configuration.

To actuate the parking brake when the piston of the service brake cylinder is in service braking position, the pressure chamber of the parking brake (filled in advance with the pneumatic pressure agent) is vented and the springs of the parking brake then act on the piston of the parking brake, which drives the sleeve until the latter comes to bear against the piston of the service brake cylinder.

The pressure chamber of the service brake cylinder may then be vented since the parking brake has been actuated.

The load applied by the parking brake on the service brake piston is directly related to the load produced by the springs. This load naturally depends on the stiffness and the extension of those springs.

With this braking system, the force applied on the braking linkage by the piston of the service brake cylinder when the parking brake has been actuated and the service brake cylinder has been vented is often less than the force applied by that same piston when it is in service braking position.

SUMMARY OF THE INVENTION

The invention concerns a rail vehicle braking system, having improved performance relative to the braking systems of the above-mentioned prior art, while being simple, convenient and economic.

According to a first aspect, the invention thus relates to a rail vehicle braking system with brakes that have at least one lining or at least one block, comprising:
- a body;
- a braking linkage configured to act on at least one said brake that has at least one lining or at least one block;
- a service brake comprising a braking piston which is movable relative to said body to act on said braking linkage and delimits with said body a service brake pressure chamber configured to be supplied by a first source of pneumatic pressure agent to put said braking piston into a service braking position; and
- a parking brake configured to act on said braking piston of said service brake and having a working configuration and a resting configuration;

said rail vehicle braking system being characterized in that:
- said braking piston is disposed in said body and has two sides, respectively a first side configured to act on said braking linkage and a second side which is an opposite side to said first side and which is turned towards said service brake pressure chamber;
- said service brake further comprises a piston rod disposed in said service brake pressure chamber and attached to said second side of said braking piston;
- said parking brake is disposed in said body and comprises a blocking device disposed in said service brake pressure chamber, which device is movable relative to said body to act on said piston rod and having a first position and a second position, as well as an actuating device which is movable relative to said body, configured to be electrically actuated and having a stable position;
- said blocking device and said actuating device being configured such that:
  - when said braking piston is in its service braking position and said parking brake is in working configuration, said actuating device acts on said blocking device until the latter immobilizes said piston rod so as to block said braking piston in its service braking position, said blocking device then being in its second position and said actuating device in its stable position; and
  - when said parking brake is in resting configuration, said actuating device acts on said blocking device until the latter frees said piston rod so as to unblock said braking piston from its service braking position, said blocking device thus being in its first position;
- on account of which the braking force applied to said braking linkage when said parking brake is in working configuration is directly related to the braking force applied to said braking linkage by said service brake in its service braking position, independently of the force applied by said blocking device on said piston rod.

In the braking system according to the invention, the braking piston is immobilized in service braking position by the parking brake and in particular by its blocking device. This means that the braking piston may be immobilized in any position, which position is linked to the travel which that piston has travelled and that travel depends on the force applied in the service braking phase.

By the term immobilize is meant the fact that the force applied by the braking piston on the braking linkage in the working configuration of the parking brake does not reduce, or almost not.

A certain loss is however accepted linked to the retraction of the braking piston, in particular on the slight movement of the piston relative to the blocking device, at the time the service brake pressure chamber is vented. This loss is controlled and is defined by a very slight reduction in the force applied which is due in particular to the manufacturing tolerances both of the blocking device and of the braking piston. This reduction in the force applied on the braking linkage is here called losses on retraction. An acceptable value for these losses on retraction is at maximum of the order of 10% of the force applied by the service brake at the time the parking brake is actuated to be in working configuration.

Thanks to the invention and in particular to the configuration of the braking piston and of the parking brake, the springs of the known braking systems described above are in particular dispensed with which make it possible to apply the parking brake force on the braking linkage via the service brake cylinder piston. Thus, for the same force applied on the braking linkage when the parking brake is in working configuration, the braking system according to the invention is more compact than the aforementioned braking systems of the prior art, and also lighter.

It should be noted that the braking linkage advantageously has deformable arms of which the elasticity may substitute for that of the springs of the known braking systems described above.

It should be noted that the configuration of the parking brake is chosen such that the load applied directly by the blocking device to immobilize the braking piston is not greater than the load applied by the springs on the piston of the aforementioned braking systems of the prior art; while the force applied on the braking linkage when the parking brake of the system according to the invention is in working configuration is at least equal to or even greater than that procured by the aforementioned braking systems of the prior art.

It will also be noted that the arrangement of the brake in the body of the system, and in particular the arrangement of the blocking device in the service brake pressure chamber, enables it to be protected from the environment of the body and enables simple and convenient lubrication.

According to preferred, simple, convenient and economical features of the system according to the invention:

said actuating device is formed by an electrical actuator;
said blocking device is disposed in a cavity of said body;
said blocking device is formed by a blocking finger and said actuating device is formed by an electrical actuator movable relative to said body and by a spring member; said electrical actuator being configured to hold said blocking finger in its first position when said electrical actuator is electrically supplied, in which first position said blocking finger is away from said piston rod; said spring member being configured to hold said blocking finger in its second position when said electrical actuator is not electrically supplied, in which second position said blocking finger immobilizes said piston rod;
said blocking device is formed by a blocking finger and said actuating device is formed by an electrical actuator movable relative to said body; said electrical actuator being configured to hold said blocking finger in its first position when said electrical actuator is electrically supplied, in which first position said blocking finger is away from said piston rod; said electrical actuator being further configured to hold said blocking finger in its second position when said electrical actuator is not electrically supplied, in which second position said blocking finger immobilizes said piston rod;
said spring member is disposed in a cavity of said body;
said parking brake further comprises an intermediate actuating lever attached both to said blocking device and to said actuating device and configured to actuate said blocking device in response to the movement of said actuating device;
said blocking device has at its distal end a tooth having at least one inclined edge and configured to cooperate in complementary manner with a complementary teeth formation having at least one inclined edge of said piston rod or of an intermediate part disposed between said piston rod and said blocking device;
said blocking device has at its distal end a tooth having straight edges and configured to cooperate in complementary manner with a complementary teeth formation having straight edges of said piston rod or of an intermediate part disposed between said piston rod and said blocking device;
said service brake further comprises a ratchet wheel mounted on said piston rod and configured to mesh with said blocking device when the latter is in its second position, in order to immobilize said piston rod;
said parking brake further comprises a unlocking part for unlocking said parking brake when the latter is in working configuration, which unlocking part is configured to act on said blocking device; and/or
said unlocking part is configured to be electrically actuated

BRIEF DESCRIPTION OF THE DRAWING FIGURES

The disclosure of the invention will now be continued with the description of embodiments, given below by way of illustrative and non-limiting examples, with reference to the accompanying drawings, in which:

FIGS. 1 to 5 diagrammatically illustrate the operation of a rail vehicle braking system in accordance with the invention, which system is provided with a pneumatic distributor and is connected to different sources of pneumatic pressure agent of the vehicle, that system being respectively in different configurations;

Figure 1:
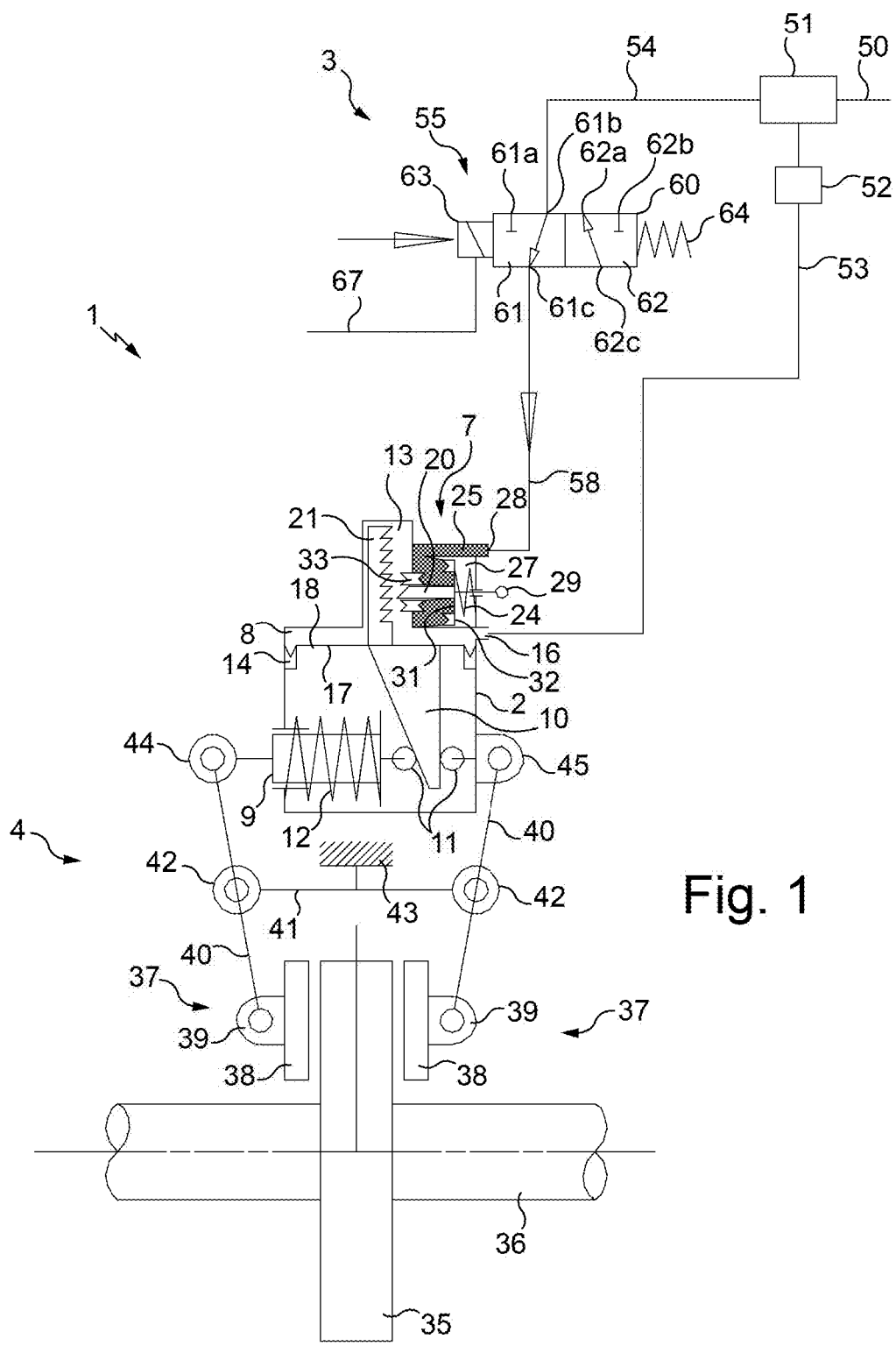
Figure 10:
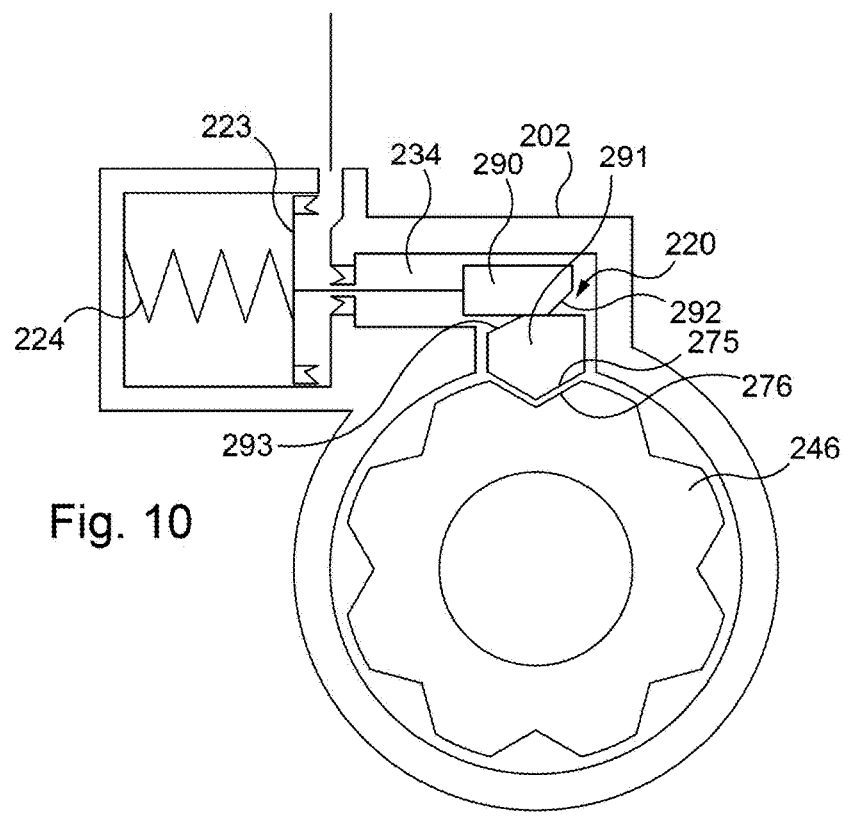
Figure 11:
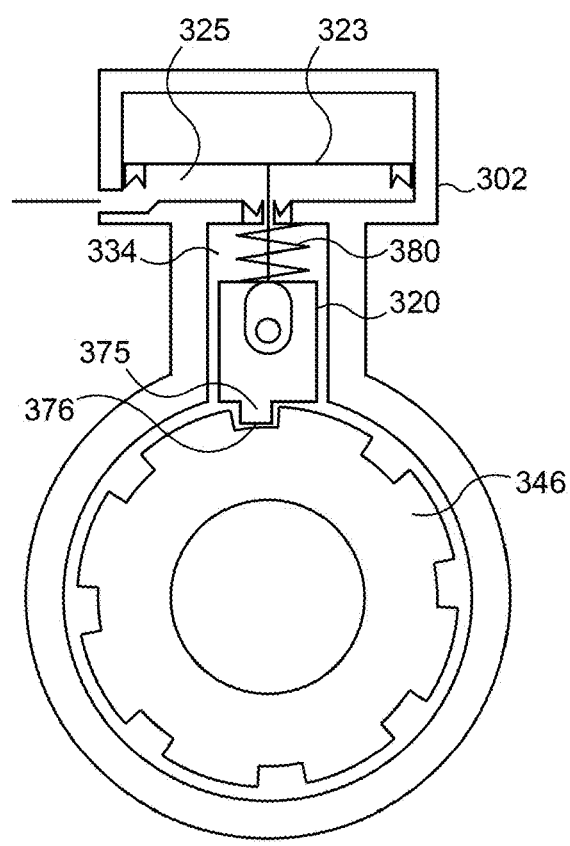
Figure 14:
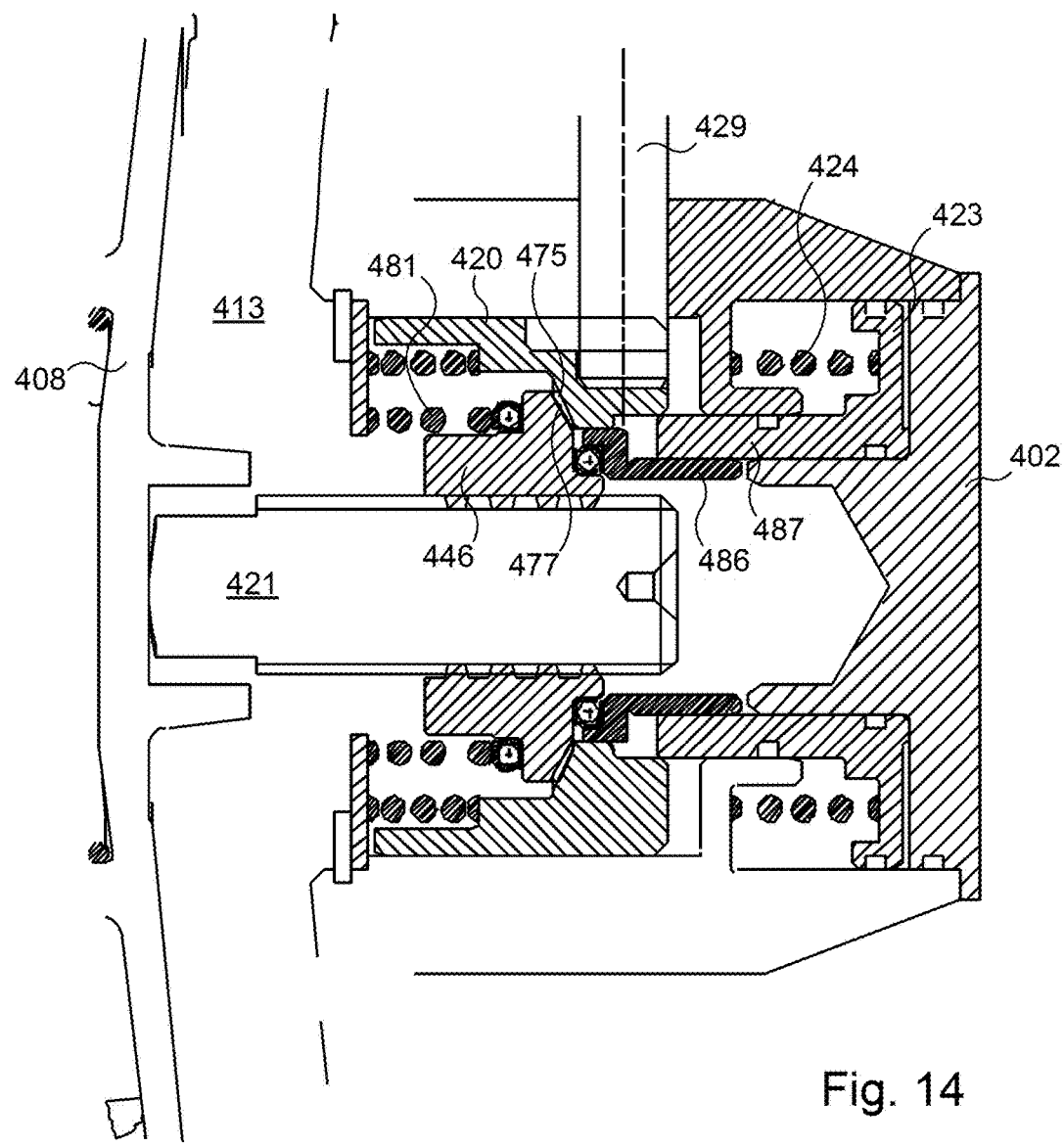
Figure 15:
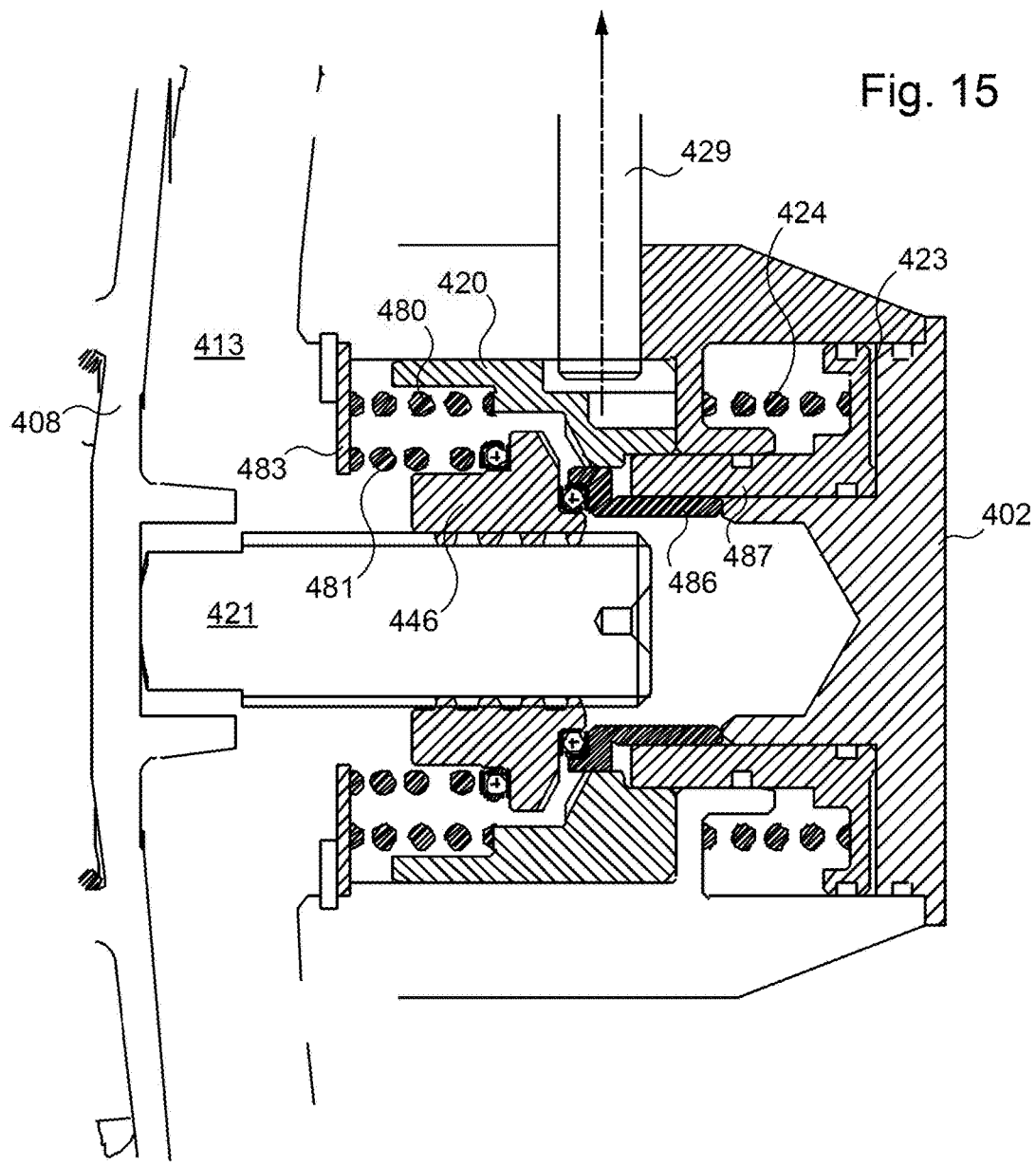
Figure 16:
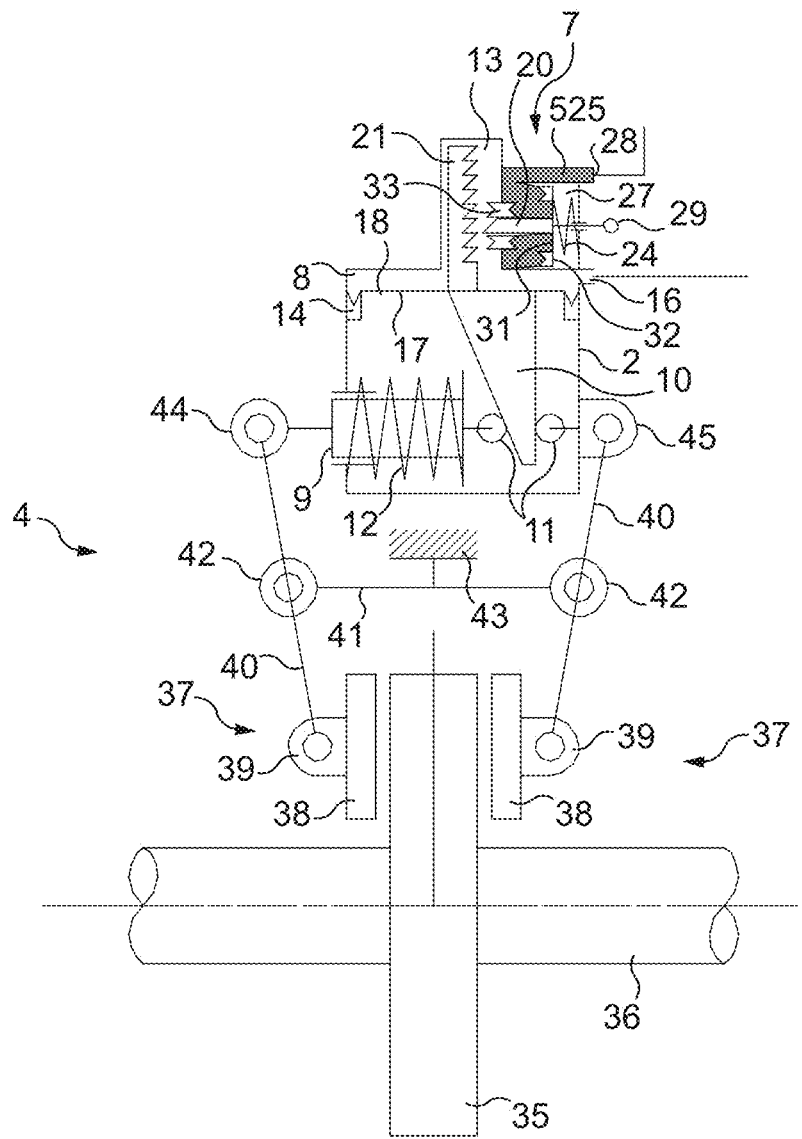

FIGS. 10 and 11 diagrammatically illustrate respectively the second and third variant embodiments of the rail vehicle braking system illustrated in FIGS. 1 to 5, in the working configuration of the parking brake which that system comprises;

FIGS. 12 to 15 are partial and diagrammatic views of a fourth variant embodiment of the rail vehicle braking system illustrated in FIGS. 1 to 5, in different configurations; and FIG. 16 is a similar view as FIG. 1, except that the parking brake is carried out by an electrical actuator rather than by the pressurization of a pressure chamber supplied by a distributor.

DETAILED DESCRIPTION OF THE INVENTION

FIG. 1 diagrammatically represents a rail vehicle braking system 1 of a rail vehicle with a brake having linings or blocks.

The rail vehicle braking system 1 comprises a body 2 here forming both a service brake cylinder 6 and a parking brake cylinder 7, a conveyance network of pneumatic pipes 3 which is connected to the body 2, a braking linkage 4 mechanically linked to the body 2 as well as a brake 5 with linings on which the braking linkage 4 is configured to act.

The body 2 here has the form of a generally closed envelope.

The service brake 6 comprises a service brake piston 8 movable relative to the body 2 in a first axial direction, and a thrust rod 9 also movable relative to the body 2 in a second axial direction perpendicular to the first axial direction.

Together with the body 2 the braking piston 8 delimits a service brake pressure chamber 13.

The braking piston 8 has two sides respectively a first side 17 configured to act on the braking linkage 4 via the thrust rod 9 and a second side 18 which is an opposite side to the first side 17 and which is turned towards the service brake pressure chamber 13.

The service brake 6 further comprises a notched rod 21 fastened to the second side 18 of the braking piston 8. This notched rod 21 extends longitudinally in the first axial direction.

The braking piston 8 is configured to move in the body 2 while maintaining the service brake pressure chamber 13 relatively fluid-tight thanks to a membrane 14 disposed between that braking piston 8 and inside edges of the body 2.

The service brake 6 further comprises a wedge part 10 fastened to the first side 17 of the braking piston 8.

This wedge part 10 has a triangular section and is configured to cooperate with a set of rolling bearing stops 11, of which one of the rolling bearing stops is linked to the body 2 while the other of the rolling bearing stops is linked to the thrust rod 9.

This thrust rod 9 is provided with a wear adjuster configured to compensate for the wear of the linings of the brake 5 in order to avoid reduction of the braking force by excessive play (further to wear of the linings).

The service brake 6 further comprises a spring 12 here disposed around the thrust rod 9, between the rolling bearing stop which is linked to the latter and the inside edge of the body 2. This spring 12 is configured to return the stop which is linked to the thrust rod 9 against the wedge part 10.

The service brake 6 further comprises a first aperture 15 formed in the body 2 and configured to enable the movement of the thrust rod 9 through that first aperture 15.

The service brake 6 further comprises a second aperture 16 formed in the body 2 and opening into the service brake pressure chamber 13.

This service brake pressure chamber 13 is connected by a brake main pipe 53, referred to also as service brake pipe, connected at the location of that second aperture 16 to a source of fluid under pressure for example such as a pneumatic line.

The body 2 comprises a cavity 27 situated against the service brake pressure chamber 13 and in which is disposed the parking brake 7.

The parking brake 7 comprises a blocking device here formed by a blocking finger 20 movable relative to the body 2 and extending in the second axial direction.

The parking brake 7 further comprises a holding piston 23 movable relative to the body 2 and with the latter delimiting a parking brake pressure chamber 25.

This holding piston 23 has two sides, respectively a first side 31 on which is attached the blocking finger 20 and a second side 32 which is an opposite side to the first side 31 and which is turned towards the parking brake pressure chamber 25.

The parking brake 7 further comprises a spring member 24 disposed between the body 2 and the second side 32 of the holding piston 23. This spring member 24 is configured to act on that holding piston 23 and therefore on the blocking finger 20.

It should be noted that the holding piston 23 and the spring member 24 form a movable actuating device of the parking brake 7.

The holding piston 23 is configured to move in the body 2 while maintaining the parking brake pressure chamber 25 relatively fluid-tight thanks to a membrane (not shown) disposed between that holding piston 23 and the inside edges of the body 2.

The parking brake 7 comprises a third aperture (not shown) formed in the body 2 and opening both into the parking brake pressure chamber 25 and into the service brake pressure chamber 13, which third aperture is configured to enable the movement of the blocking finger 20 through that third aperture.

It should be noted that the relative sealing between the parking brake pressure chamber 25 and the service brake pressure chamber 13 is ensured by the presence of a seal 33 disposed at the interface between that third aperture and the blocking finger 20.

The parking brake 7 further comprises a fourth aperture 28 formed in the body 2 and opening into the parking brake pressure chamber 25.

It will furthermore be noted that this parking brake pressure chamber 25 is connected by a parking brake pipe 58 that is connected at the location of that fourth aperture 28 to the source of fluid under pressure, for example such as a pneumatic line.

The parking brake 7 further comprises an unlocking part 29 attached to the second side 32 of the holding piston 23 and opening outside the body 2 through a fifth aperture (not shown) formed in that body 2 and opening into the cavity 27; such that this unlocking part 29 is accessible to be manipulated from outside the body 2.

The service brake 6 is disposed in the body 2 and is configured to act on the brake 5 via the braking linkage 4.

This brake 5 comprises a brake disk 35 (here viewed from above) mounted for example on a rail vehicle axle 36, or directly on the wheel to brake.

This brake 5 further comprises two shoes 37 each provided with a lining 38 configured to be applied in contact with the disk 35 to reduce its rotational speed and therefore that of the wheel to brake, as well as a fastening eye 39 provided at the remote opposite location to the surface of the lining 38 that is configured to be applied to the disk brake 35.

The braking linkage 4 comprises two deformable levers 40 each provided with an upper arm and a lower arm which are attached to each other.

Each arm of the levers 40 is jointed to a central connector 41 via two pivots 42.

The lower arm of each deformable lever 40 is linked to one of the shoes 37 via its fastening eye 39.

The upper arm of each deformable lever 40 is linked to a respective joint 44, 45.

The braking linkage 4 receives the body 2 between the upper arms of the deformable levers 40, at the location of the joints 45 and 46.

The body 2 is rotatably mounted on the joint 44 which is attached to an end of the thrust rod 9 whereas it has a fixed mounting to the joint 45, which is directly attached to that body 2.

The braking linkage 4 also comprises a fastening lug 43 attached to the central connector 41 for the mounting of that braking linkage 4 on the rail vehicle; in order for the brake shoes 37 to be situated on respective opposite sides of the brake disk 35 (or of the rail vehicle wheel).

It should be noted that the coming towards each other of the joints 44 and 45 enables the shoes 37 to move apart from each other and that conversely, the separation of those joints 44 and 45 enables the shoes 37 to be to clamped onto the brake disk 35 (or onto the rail vehicle wheel).

The conveyance network of pneumatic pipes 3 comprises a main pneumatic line formed by a main pipe 50 which is configured for conveyance along the rail vehicle.

This network 3 further comprises an auxiliary reservoir 51 connected to the main pipe 50.

It is to be noted that such an auxiliary reservoir 51 is generally present on each bogie of the rail vehicle.

The main pipe 50 is configured to transport a fluid under a predetermined first pressure, for example substantially equal to 5.5 bars. The auxiliary reservoir 51 thus comprises a fluid at such a predetermined first pressure.

The network 3 comprises, at the outlet of the auxiliary reservoir 51 (the main pipe 50 being connected to the inlet of that auxiliary reservoir 51), two distinct pneumatic lines also called first source of pneumatic pressure agent and second source of pneumatic pressure agent, each being configured to supply the service brake 6 and/or the parking brake 7.

The first source of pneumatic pressure agent is formed by a pressure regulator 52 (here a pressure reducing valve) disposed at the outlet of the auxiliary reservoir 51 and configured to limit the pressure of the fluid passing in that first source of pneumatic pressure agent to a second determined pressure, for example substantially equal to approximately 3.8 bars.

This first source of pneumatic pressure agent further comprises the brake main pipe 53 (mentioned earlier) connected to the pressure limiter 52 and configured to transport the fluid under the second predetermined pressure, which pipe is connected to the second aperture 16 of the service brake 6 to supply the service brake pressure chamber 13.

The second source of pneumatic pressure agent is formed by a brake secondary pipe 54 connected directly to the outlet of the auxiliary reservoir 51, and by a parking brake pipe 58 connected to the fourth aperture 28 of the parking brake 7 which opens into the parking brake pressure chamber 25 to pneumatically supply the latter.

The network 3 also comprises a monostable distributor 55 here with three apertures and two positions which is interposed between the brake secondary pipe 54 and the parking brake pipe 58, with each of its pipes 54, 58 being connected to that distributor 55.

This distributor 55 comprises a movable slide 60 and an actuator 63 which is configured to move that slide 60.

That actuator 63 is configured to receive a control signal 67, for example pneumatic.

That distributor 55 also comprises a return spring 64 configured to move the slide 60 from a first position to a second position.

It should be noted that in FIGS. 1 and 2, the distributor 55 is represented in its first position, which first position is not its position by default.

Figure 4:
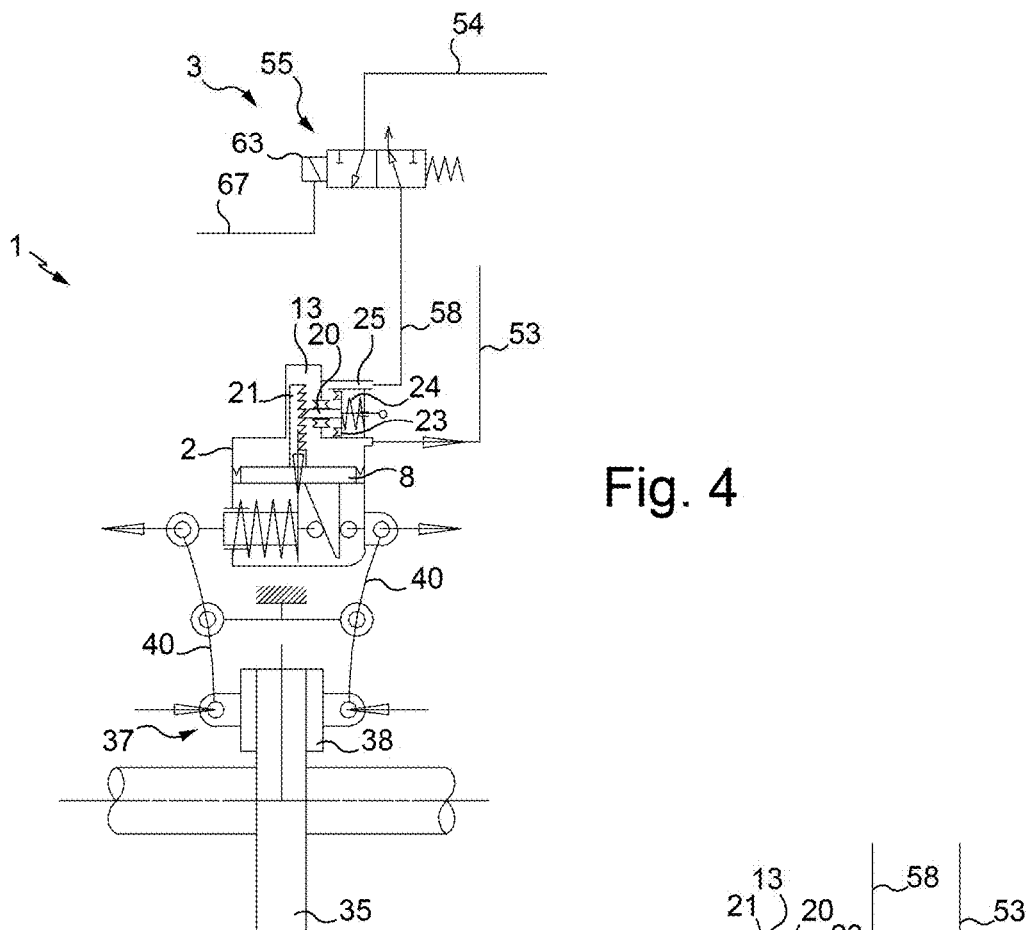

In other words, the actuator 63 of the distributor 55 is configured to receive a pneumatic signal that is not null or which is at least sufficient to move the slide 60 between its second position (position by default also called "normally closed" position illustrated in FIGS. 3 and 4) and its first position (illustrated in FIGS. 1 and 2).

It should be noted that the slide 60 comprises a first chamber 61 provided with three inlets/outlets 61a-c and with a second chamber 62 also provided with three inlets/outlets 62a-c.

In each of the first and second positions of the slide 60, the brake secondary pipe 54 and the parking brake pipe 58 are each linked to one of the three inlets/outlets 61a-c and 62a-c.

The operation of the rail vehicle braking system 1 will now be described with reference to FIGS. 1 to 5, which diagrammatically illustrate different configurations of the system 1.

In FIG. 1, the rail vehicle braking system 1 is in a resetting configuration.

In this resetting configuration, the service brake pressure chamber 13 is not supplied (it has been vented) such that the braking piston 8 is in a resting position, in which it does not apply any braking force on the thrust rod 9.

Therefore, the joints 44 and 45 of the braking linkage 4 are away from each other which allows the shoes 37 to be kept away from the brake disk 35.

As regards the parking brake pressure chamber 25, it is supplied by the parking brake pipe 58, which pipe is connected via the distributor 55 to the brake secondary pipe 54, itself being directly connected to the auxiliary reservoir 51.

The parking brake pressure chamber 25 is thus under pressure such that the holding piston 23 is in a first position in which the spring member 24 is compressed and the blocking finger 20 is in a first position away from the notched rod 21 of the service brake 6.

In this resetting configuration of the system 1, the parking brake 7 is in a reset configuration whereas the service brake 6 is in a resting configuration.

Furthermore, the slide 60 of the distributor 55 is in its first position which indicates that the actuator 63 has received a control signal 67 (that is not null) and thus the slide 60 has been moved from its second position (position by default) to its first position against the return spring 64, which is compressed.

In this first position of the slide 60, the first chamber 61 has a first supply inlet 61b connected to the auxiliary reservoir 51 via the brake secondary pipe 54, a first parking brake outlet 61c in fluidic communication with the first supply inlet 61b and connected to the parking brake pressure chamber 25 via the parking brake pipe 58.

Furthermore, the first chamber 61 has a blocked first aperture 61*a* not connected and configured to prevent the passage of fluid if the brake secondary pipe 54 were to be connected thereto.

None of the inlets or outlets of the second chamber 62 of the drawer 60 is connected.

It should be noted that the parking brake 7 is dimensioned and configured such that the pressure for resetting the parking brake 7 is relatively low, for example of the order of 2 bar to 6 bar.

In FIG. 2, the rail vehicle braking system 1 is represented in a configuration for application of the service brake 6.

In this configuration for application of the service brake 6, the service brake pressure chamber 13 is supplied by the brake main pipe 53.

The service brake pressure chamber 13 is thus under pressure and the braking piston 8 has been moved in the first axial direction from its first position to a second position in which the wedge piece 10 has moved apart the set of rolling bearing stops 11, thereby moving the thrust rod 9 and the joint 44.

Therefore, the joints 44 and 45 move away from each other and give rise to the coming towards each other of the shoes 37 and thus the application of the linings 38 against the brake disk 35.

It should be noted that in the configuration for application of the service brake 6 of the system 1, the levers 40 are deformed (elastically).

It will also be noted that in this configuration illustrated in FIG. 2, the parking brake pressure chamber 25 is still under pressure as mentioned with reference to with reference to FIG. 1.

In this configuration of application of the service brake 6 of the system 1, the parking brake 7 is still in its reset configuration whereas the service brake 6 is in a working configuration.

The position of the slide 60 of the distributors 55 is thus similar to that illustrated in FIG. 1.

It will also be noted that in the configuration illustrated in FIG. 2, the first predetermined pressure of the fluid injected into the service brake pressure chamber 13 moves the braking piston 8 by a predetermined travel in order to act on the braking linkage 4 with a first load and therefore apply a first predetermined force on the brake disk 35.

In FIG. 3, the rail vehicle braking system 2 is represented in a locking configuration in which the braking piston 8 of the service brake 6 is immobilized in its second position illustrated in FIG. 2.

It should be noted that the braking linkage 4 is here in the same position as that illustrated in FIG. 2.

As regards the service brake pressure chamber 13 this is still under pressure whereas the parking brake pressure chamber 25 has been vented.

The venting of the parking brake pressure chamber 25 frees the spring member 24, which moves the holding piston 23 from its first position towards a second position referred to as stable position and thus moves the blocking finger 20 from its first position to a second position in which it comes to immobilize the notched rod 21 by meshing of the distal end of that blocking finger 20 with the notches formed on the notched rod 21.

To perform the venting of the parking brake pressure chamber 25, the actuator 63 of the distributor 55 has received a different control signal 67, here null for example, such that the slide 60 has passed from its first position to its second position under the action of the return spring 64.

In this second position of the slide 60, the second chamber 62 of that slide 60 has a second parking brake outlet 62*c* connected to the parking brake pressure chamber 25 via the parking brake pipe 58 and a first exhaust outlet 62*a* in fluidic communication with the second parking brake outlet 62*c* and opening to the atmosphere.

Furthermore, the second chamber 62 has a blocked second aperture 62*b* which is not connected.

In this locking configuration of the system 1, the parking brake 7 and the service brake 6 are each in a working configuration.

In FIG. 4, the rail vehicle braking system 2 is represented in a configuration for venting the service brake 6.

The venting of the service brake pressure chamber 13 is carried out through the leakages in the network 3. In other words, neither the service pressure chamber 13, nor the brake secondary pipe 54, nor the brake main pipe 53 are directly connected to the atmosphere.

It should be noted that the fluid under pressure present in the service brake pressure chamber 13 exhausts from the latter in particular from the brake main pipe 53.

It should be noted that in this venting of the service brake 7 of the system 1, the distributor 55 has its slide 60 in its second position.

It will also be noted that, thanks to the parking brake 6 and in particular the blocking finger 20—holding piston 23—spring member 24 group, in combination with the notched rod 21 which is fastened to the braking piston 8 of the service brake 6, that braking piston 8 remains in its second position in which it acts on the braking linkage 4 to apply the predetermined force on the brake disk 35 via the shoes 37, despite the venting of the service brake pressure chamber 13.

In this venting configuration of the service brake 6, the parking brake 7 is in a working configuration whereas the service brake 6 is blocked in its working configuration, despite the venting of the service brake pressure chamber 13.

Figure 5:
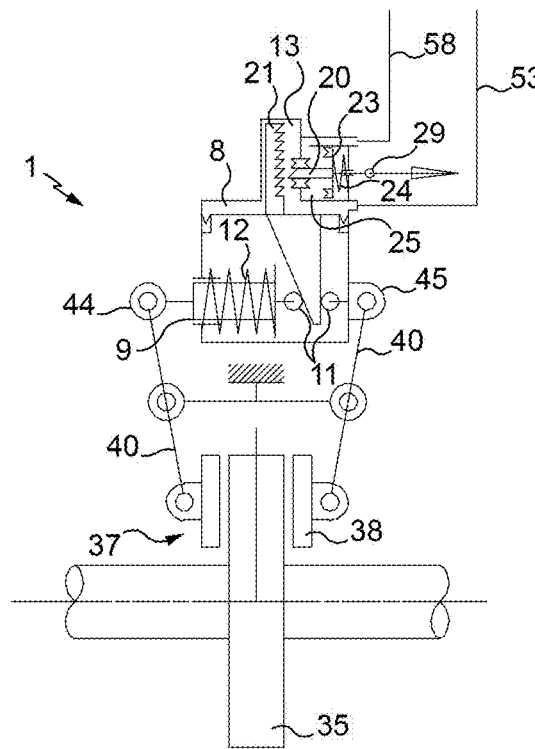
Figure 6:
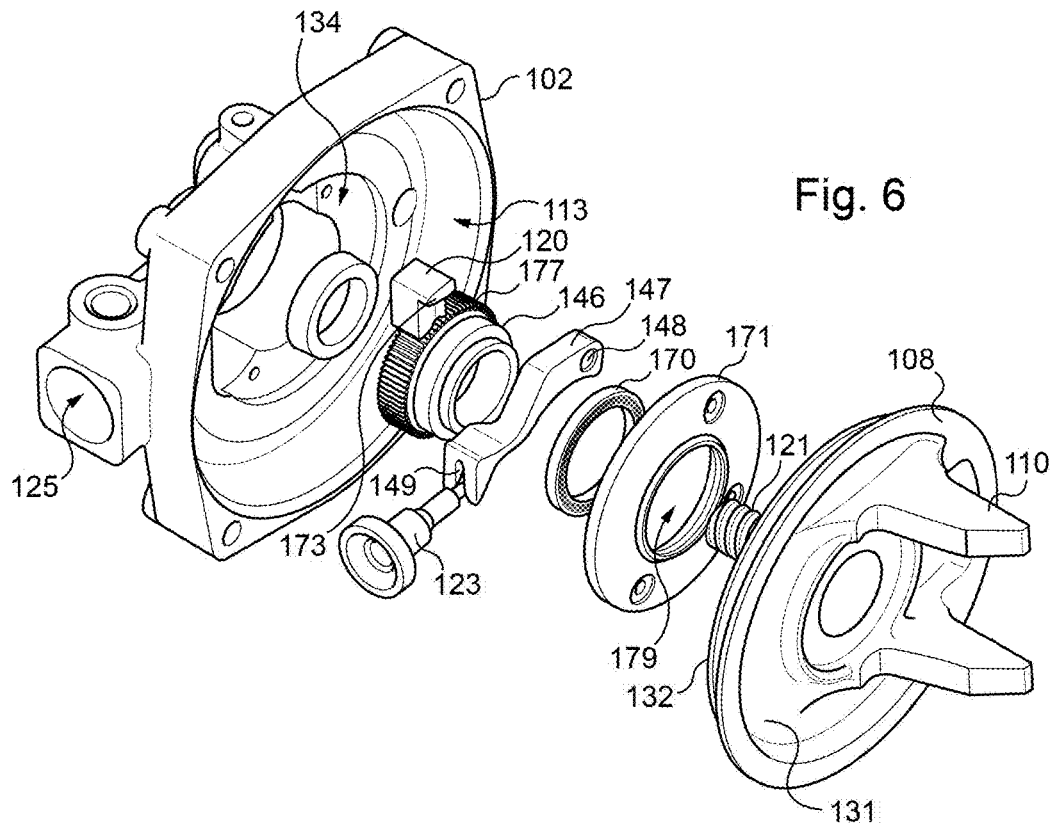
FIG. 6 is an exploded perspective view of a first variant embodiment of the rail vehicle braking system.
Figure 7:
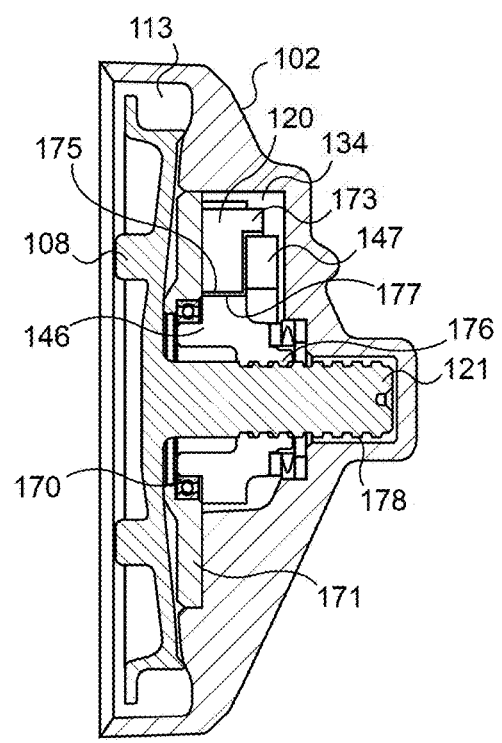
FIG. 7 is a diagrammatic section view of the rail vehicle braking system illustrated in FIG. 6, here assembled.

In FIG. 5, the rail vehicle braking system 1 is represented in an unlocking configuration.

In this unlocking configuration, a force has been applied to the unlocking part 29 of the parking brake 6 so as to pull that unlocking part 29 towards the outside of the body 2.

The movement of that unlocking part 29 drives the holding piston 23 and therefore the blocking finger 20 against the spring member 24 which is thereby compressed.

When the blocking finger 20 reaches its second position, the latter no longer cooperates with the notched rod 21, which is thus free.

Therefore, the spring 12 disposed around the thrust rod 9 and between the inside edge of the body 2 and the rolling bearing stop fastened to the thrust rod 9 resumes its initial position.

This spring 12 thus drives the rolling bearing stop 11 disposed between the thrust rod 9 and the wedge part 10 in the second axial direction, thereby driving the return of the braking piston 8 in the first axial direction, to reach its resting position.

The joints 44 and 45 of the braking linkage are brought towards each other such that the deformable levers 40 resume their initial positions illustrated in FIG. 1 and the shoes 37 are again situated away from the brake disk 35, which is thus free to rotate (the brake disk 35 is not braked).

In this unlocking configuration, the parking brake 7 is in an unlocking configuration whereas the service brake 6 is in a resting configuration.

In the unlocking configuration of the system 1, it should be noted that the distributor 55 is for example in the same configuration as that illustrated in FIG. 4, with the service brake chamber 13 and parking chamber 25 vented.

It should be noted that the parking brake 6 is configured such that the force to apply for the unlocking, via the unlocking part 29, is relatively low in order to be provided manually by a user such as the driver of the rail vehicle. For example this force is of the order of approximately 10 to 50 daN.

FIGS. 6 to 9 diagrammatically and partially illustrate a first variant embodiment of the rail vehicle braking system illustrated in FIGS. 1 to 5, and in particular the assembly formed by the body and the parking and service brakes mounted in that body.

Generally, for similar parts the same references have been used, but to which the number 100 has been added.

The body 102 here has the form of a generally parallelepiped closed envelope, provided with a cylindrical central cavity divided into two spaces respectively forming the service brake pressure chamber 113 and a secondary cavity 134, and a cylindrical lateral cavity in which is formed the parking brake pressure chamber 125.

The service brake here comprises a service brake piston 108 movable relative to the body 102 formed for example as a single unit with the wedge part 110 which projects from the first side 131 of that piston 108 and with the piston rod 121 which projects from the second side 132 of that piston 108 towards the secondary cavity 134.

The piston rod 121 is provided here with a threaded outside surface 178.

The body 102 further comprises a flange 171 fastened in the body 102 and configured to separate the service brake pressure chamber 113 and the secondary cavity 134. This flange 171 is applied against the second side 132 of the braking piston 108.

The body 102 further comprises a annular sealing ring 170 disposed in an annular aperture 179 of the flange 171 and through which the piston rod 121 is able to move in translation. This annular sealing ring 170 is applied against the second side 132 of the braking piston 108.

The parking brake here comprises a holding piston 123 and a spring member 124 (FIGS. 8 and 9) disposed in the cylindrical lateral cavity in which is formed the parking brake pressure chamber 125. It will be noted that the holding piston 123 enters the secondary cavity 134. The spring member 124 is configured to act on that holding piston 123.

The parking brake further comprises an intermediate actuating lever 147 disposed in the secondary cavity 134, fastened to the holding piston 123 by an end cut-out 149 and fastened to the body 102 by a pivotal link 148 configured to enable the rotational movement of the intermediate actuating lever 147 in response to the translational movement of the holding piston 123.

The group comprising the spring member 124, the holding piston 123 and the intermediate actuating lever 147 forms the actuating device.

The parking brake 7 comprises a blocking finger 120 disposed in the secondary cavity 134 of the body 102.

This blocking finger 120, also called blocking bolt, has at a distal end a tooth 175 having a straight edge and an inclined edge, as well as a rim 173 formed at the remote opposite location to its distal end and configured to cooperate with the intermediate actuating lever 147 to move the blocking finger 120 in translation (raise/release) in response to the rotational movement of that intermediate actuating lever 147, and therefore in response to the translational movement of the holding piston 123.

The parking brake further comprises a return spring 180 accommodated between the body 102 and the blocking finger 120 in the secondary cavity 134. This return spring 180 is configured to act on the blocking finger 120 to hold it in its second position when the parking brake pressure chamber 125 has been vented.

The parking brake further comprises a ratchet wheel 146 mounted on the piston rod 121. This ratchet wheel 146 has a threaded inside surface 176 configured to cooperate with the threaded outside surface 178 of the piston rod 121 to enable the translational movement of the piston rod 121 at the same time as the rotation of the ratchet wheel 146. In other words, the translation of the piston rod 121 drives the ratchet wheel 146 to rotate.

The ratchet wheel 146 furthermore has an outside surface on which is formed a teeth formation 177 of which the teeth each have a straight edge and an inclined edge arranged to cooperate with the edges of the tooth 175 of the blocking finger 120.

It should be noted that the parking brake further comprises a manual unlocking part (not shown) configured to act on the holding piston 123 against the spring member 124 in order to raise the blocking finger 120 and thus leave the ratchet wheel 146 free to rotate.

Figure 8:
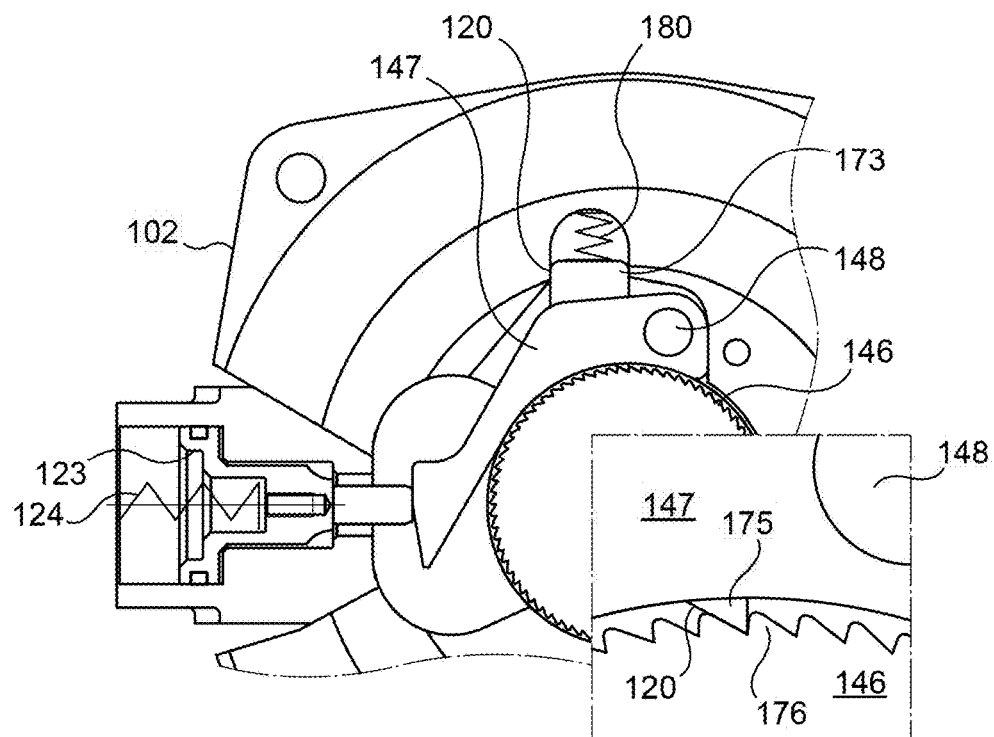
FIGS. 8 and 9 are partial views of the rail vehicle braking system illustrated in FIGS. 6 and 7, respectively in a working configuration and in a resetting and/or unlocking configuration of a parking brake of that system, with furthermore an enlargement of a detail in the bottom right of each Figure.

In FIG. 8, the rail vehicle braking system is in its locking configuration in which the blocking finger 120 immobilizes the piston rod 108 and therefore the braking piston 108 is in its second position referred to as service braking position.

The service brake pressure chamber 113 is under pressure whereas the parking brake pressure chamber 125 has been vented.

The venting of the parking brake pressure chamber 125 frees the spring member 124, which moves the holding piston 123 from its first position to a second position referred to as stable position and thus moves the intermediate actuating lever 147 towards the ratchet wheel 146 (downwards).

The blocking finger 120 is thus freed from the lever 147, the return spring 180 relaxes and moves that blocking finger 120 from its first position towards its second position in which the ratchet wheel 146 immobilizes the ratchet wheel 146 (that is to say to prevents the rotation in one direction). The tooth 175 of the blocking finger 120 comes to cooperate with a tooth of the teeth formation 176 of the ratchet wheel 146.

The immobilization of the ratchet wheel 146 makes it possible to block the movement of the piston rod 121 in a reverse direction to the braking direction. In other words, the ratchet wheel prevents the piston rod from retracting towards the secondary cavity 134 away from the service brake pressure chamber 113.

In this locking configuration of the service brake, the parking brake and the service brake are each in a working configuration.

The service brake pressure chamber 113 may then be vented to bring the service brake into resting configuration, the braking piston 108 being blocked in its second position.

Figure 9:
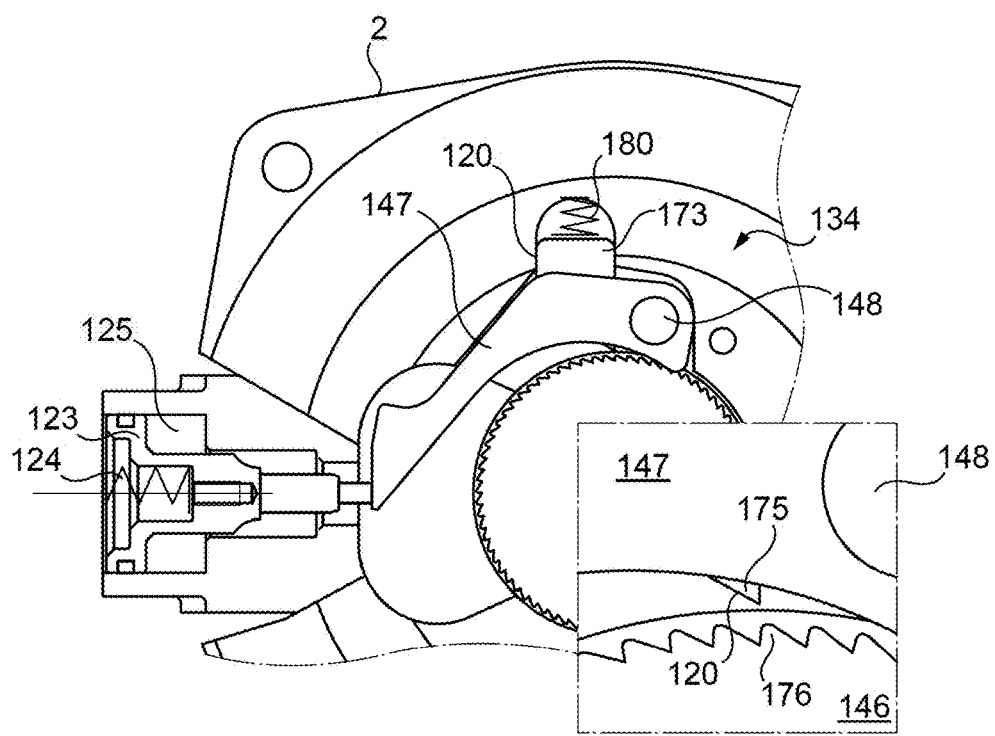

In FIG. 9, the rail vehicle braking system is in its unlocking and/or resetting configuration in which the blocking finger 120 and the rest of the blocking device does not immobilize the piston rod 121 and therefore the braking piston 108 returns to its first position referred to as resting position if the service brake pressure chamber 113 is not under pressure.

In the resetting and/or unlocking configuration, the service brake pressure chamber 113 is not supplied (it has been vented) such that the braking piston 108 is in a resting position.

In the resetting configuration, the parking brake pressure chamber 125 is under pressure such that the holding piston 123 is located in its first position in which the spring member 124 is compressed, the intermediate actuating lever 147 in high position and the blocking finger 120 in its first position away from the ratchet wheel 146.

In the unlocking configuration, a force has been applied to the unlocking part of the parking brake so as to pull that unlocking part towards the outside of the body.

The movement of that unlocking part drives the holding piston 123 and therefore the lever 147, which comes into contact with the rim 173 of the blocking finger 120 to raise it against the return spring 180 and thus bring it away from the ratchet wheel. When the blocking finger 20 reaches its second position, the latter no longer cooperates with the ratchet wheel 146, which is thus free (just like the piston rod 121).

FIG. 10 diagrammatically and partially illustrates another variant embodiment of the rail vehicle braking system illustrated in FIGS. 1 to 5 and of that illustrated in FIGS. 6 to 9.

Generally for similar parts the same references have been used but to which the number 200 has been added relative to the system illustrated in FIGS. 1 to 5 and to which the number 100 has been added relative to the system illustrated in FIGS. 6 to 9.

The service brake here has a ratchet wheel 246 on the piston rod. This ratchet wheel 246 has on its outside surface a teeth formation 276 having teeth with inclined opposite edges.

The parking brake here comprises a holding piston 223 disposed in the parking brake pressure chamber 225 and a spring member 224 also disposed in that chamber 225.

The parking brake further comprises a blocking device 220 here formed from two parts, respectively a thrust part 290 disposed in the secondary cavity 234 and fastened to the holding piston 223 and a stop part 291 which is free in the secondary cavity 234.

The thrust part 290 and the stop part 291 each have a respective leading edge 292, 293 whereas the stop part 291 has, at its opposite distal end to the leading edge 293, a tooth with inclined opposite edges 275 which is configured to be complementary to the teeth formation 276 of the ratchet wheel 246.

In FIG. 10, the rail vehicle braking system is in its locking configuration.

The parking brake pressure chamber 225 is vented and the spring member 224 relaxes and moves the holding piston 223 which pushes the thrust part 290 in a first direction in order for the latter to come to bear by its leading edge 292 against the leading edge 293 of the stop part 291. The stop part 291 is then moved in a second direction perpendicular to the first direction until its tooth 275 meshes with a tooth of the teeth formation 276 of the ratchet wheel 246 to immobilize the latter.

It should be noted that as soon as the parking brake pressure chamber 225 is supplied and under pressure, the holding piston 223 moves against the spring member 224 and drives the thrust part 290 to free the stop part 291 which no longer meshes with the ratchet wheel 246, which is free to rotate.

FIG. 11 diagrammatically and partially illustrates another variant embodiment of the rail vehicle braking system illustrated in FIGS. 1 to 5, of that illustrated in FIGS. 6 to 9 and of that illustrated in FIG. 10.

Generally for similar parts the same references have been used but to which the number 300 has been added relative to the system illustrated in FIGS. 1 to 5, to which the number 200 has been added relative to the system illustrated in FIGS. 6 to 9 and to which the number 100 has been added relative to the system illustrated in FIG. 10.

The service brake is provided with a ratchet wheel 346 on its piston rod. This ratchet wheel 346 has on its outside surface a teeth formation 376 having teeth with straight opposite edges.

The parking brake here comprises a holding piston 323 disposed in the parking brake pressure chamber 225 and has no spring member in that chamber.

The parking brake comprises another spring member, also called return spring 380, disposed in the secondary cavity 334 and configured to directly act on the blocking finger 320.

This blocking finger 320 is provided at its distal end with a tooth 375 of which the opposite edges are straight to be complementary with the teeth formation 376 of the ratchet wheel 346.

It will be noted that the holding piston 323 is directly linked here to the blocking finger 320, without any intermediate actuating lever.

In FIG. 11, the rail vehicle braking system is in its locking configuration.

Thus, the blocking finger 320 immobilizes the ratchet wheel 346. It should be noted that on account of the shape of the tooth 375 of the blocking finger 320 and of the teeth formation 376 of the ratchet wheel 346, the latter is rotationally blocked in both directions of rotation.

FIGS. 12 to 15 diagrammatically and partially represent another variant embodiment of the rail vehicle braking system illustrated in FIGS. 1 to 5, and of those illustrated in FIGS. 6 to 9, 10 and 11.

Generally for similar parts the same references have been used but to which the number 400 has been added relative to the system illustrated in FIGS. 1 to 5, to which the number 300 has been added relative to the system illustrated in FIGS. 6 to 9, to which the number 200 has been added relative to the system illustrated in FIG. 10, and to which the number 200 has been added relative to the system illustrated in FIG. 11.

The body 402 here has the form of a generally parallelepiped closed envelope, provided with a central cavity divided into two spaces respectively forming the service brake pressure chamber 413 and a secondary cavity 434, and a lateral cavity in which is formed the parking brake pressure chamber 425.

The service brake here comprises a service brake piston 408 movable relative to the body 402 and a piston rod 421 which projects from the second side 432 of the piston 408 towards the secondary cavity 434.

The piston rod 421 is provided here with a threaded outside surface 478.

The parking brake here comprises a holding piston 423 and a first spring member 424 disposed in the lateral cavity in which is formed the parking brake pressure chamber 425. It will be noted that the holding piston 423 enters the secondary cavity 434. The first spring member 424 bears against an internal lug 482 formed in the body 402 and is configured to act on that holding piston 423.

The holding piston 423 comprises an extension 487 extending in the secondary cavity 434 to come into contact with both an intermediate device 486 and with a blocking part 420.

It should be noted that the group comprising the first spring member 424 and the holding piston 423 forms the actuating device.

The parking brake further comprises a second spring member 480 which bears against an internal stop 483 provided in the body 402 and is configured to act on that blocking part 420.

This blocking part 420 is provided with an inclined wall on which is formed a teeth formation 175 having teeth with at least one inclined edge.

It should be noted that the second spring member 480 is configured to act on the blocking part 420 to keep it in its second position when the service brake pressure chamber 425 has been vented.

The parking brake further comprises a ratchet wheel 446 mounted on the piston rod 421. This ratchet wheel 446 has a threaded inside surface 476 configured to cooperate with the threaded outside surface 478 of the piston rod 421 to enable the translational movement of the piston rod 421 at the same time as the rotation of the ratchet wheel 446.

The ratchet wheel 446 furthermore has an outside surface on which is provided a teeth formation 477 of which the teeth each have at least one inclined edge arranged to cooperate with the teeth formation 475 of the blocking part 420.

The parking brake further comprises a third spring member 481 which bears against the internal stop 483 and is configured to act on the ratchet wheel 446.

It should be noted that the parking brake further comprises a manual unlocking part 429 configured to act on the blocking part 420 and so leave the ratchet wheel 446 free to rotate.

Figure 12:
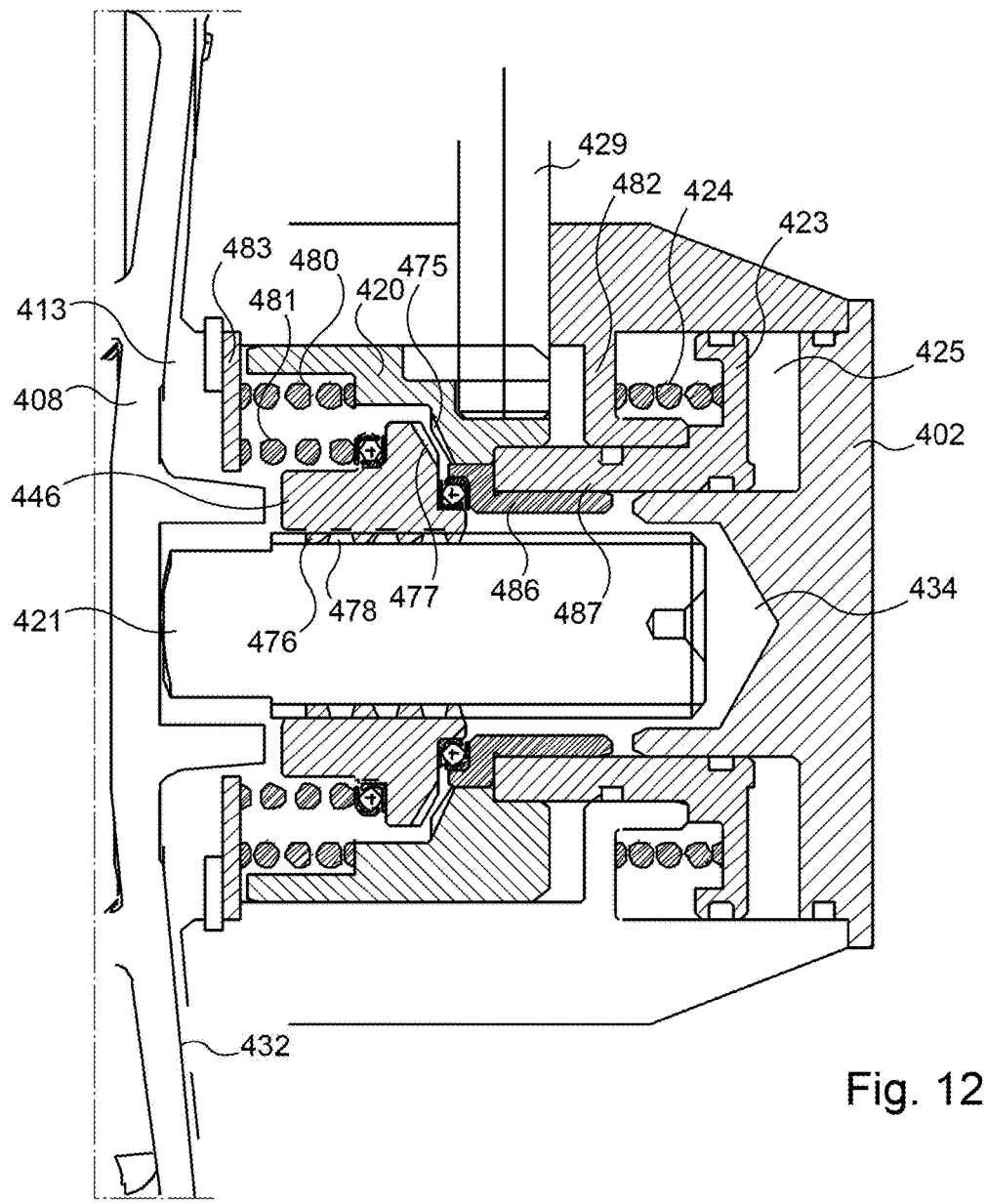

In FIG. 12, the system is in its resetting configuration.

In this resetting configuration, the service brake pressure chamber 413 is not supplied (it has been vented) such that the braking piston 408 is in its resting position.

As regards the parking brake pressure chamber 425 this is supplied and under pressure such that the holding piston 423 is in a first position in which the first spring member 424 is compressed and the blocking part 420 is in a first position in which its inclined wall provided with the teeth formation 175 is away from the ratchet wheel 446 and in particular from its external teeth formation 477. The second and third spring members 480 and 481 are compressed here.

In this resetting configuration of the system, the parking brake is in a reset configuration whereas the service brake is in a resting configuration.

Figure 13:
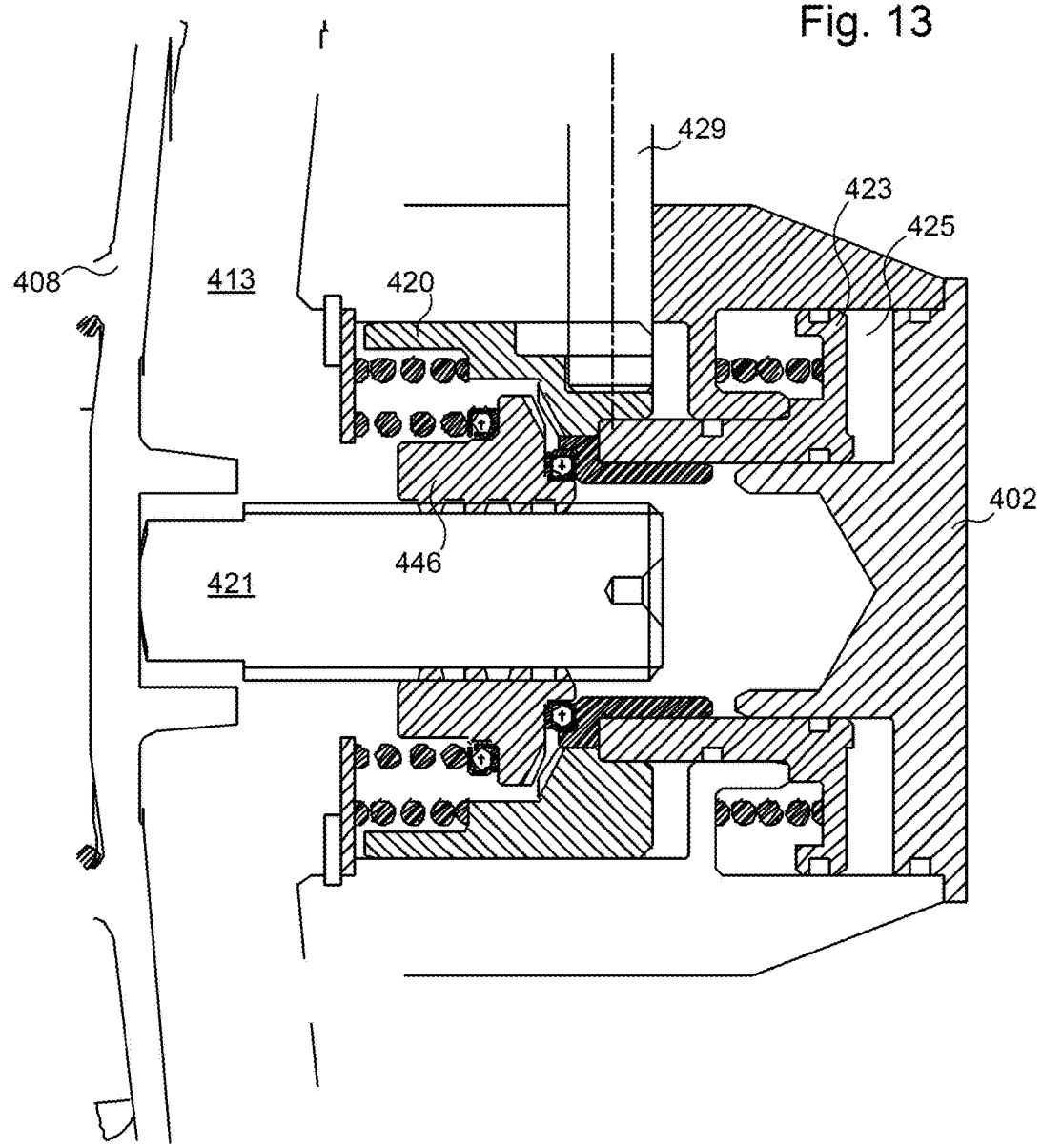

In FIG. 13, the system is represented in its configuration for application of the service brake.

In this configuration for application of the service brake, the service brake pressure chamber 413 is supplied and under pressure and the braking piston 408 has been moved from its first position to a second position referred to as service braking position.

It should be noted that the piston rod 421 has moved in translation through the ratchet wheel 446 while generating the rotation of the latter, which is free to rotate.

It will also be noted that in this configuration illustrated in FIG. 13, the parking brake pressure chamber 425 is still under pressure as mentioned with reference to with reference to FIG. 12.

In this configuration of application of the service brake of the system, the parking brake is thus still in its reset configuration whereas the service brake is in a working configuration.

In FIG. 14, the system is represented in a locking configuration in which the braking piston 408 of the service brake is immobilized in its second position illustrated in FIG. 13.

The service brake pressure chamber 413 is still under pressure whereas the parking brake pressure chamber 425 has been vented.

The venting of the parking brake pressure chamber 425 frees the first spring member 424, which moves the holding piston 423 from its first position to a second position referred to as stable.

Thus, the extension 487 of the holding piston 423 no longer bears against the intermediate device 486, which is then free to move in translation.

The third spring member 481 relaxes and drives the ratchet wheel 446 to rotate to move it towards the extension 487 until it comes to bear against the teeth formation 475 of the blocking part 420 with which the teeth formation 477 of that ratchet wheel 446 cooperates.

As regards the intermediate device 486, this is pushed in translation by the ratchet wheel 446 towards the extension 487.

The ratchet wheel 446 thus comes to be immobilized against the blocking part 420 and therefore, the piston rod 421 is also immobilized in translation.

In this locking configuration of the service brake, the parking brake and the service brake are each in a working configuration.

In FIG. 15, the system is represented in a configuration for venting the service and unlocking brake.

The venting of the service brake pressure chamber 413 is carried out through the leakages in the network, or as a variant deliberately.

It should be noted that thanks to the parking brake and in particular to the blocking part 420—ratchet wheel 446—holding piston 423—spring member 424 group, in combination with the piston rod 421 fastened to the braking piston 408 of the service brake, that braking piston 408 remains in its second position, despite the venting of the service brake pressure chamber 413.

In this venting configuration of the service brake, the parking brake is in a working configuration whereas the service brake is blocked in its working configuration.

In the unlocking configuration, a force has been applied to the unlocking part 429 of the parking brake so as to pull that unlocking part 429 towards the outside of the body 402.

The movement of that unlocking part 429 drives the unlocking of the blocking part 420 and the second spring member 480 relaxes and moves the blocking device 420 in translation towards its second position.

When the blocking part 420 reaches its second position, the latter no longer cooperates with the ratchet wheel 446, which is then free to rotate.

Therefore, the piston rod 421 is again free to move in translation.

In this unlocking configuration, the parking brake is in an unlocking configuration whereas the service brake is in a resting configuration.

In a variant not illustrated, the distributor is not pneumatically controlled but instead electrically or hydraulically; and/or it further comprises a valve with a threshold configured to control and actuate the passage of the slide of the distributor from a first state thereof to a second state. Here, the first state corresponds to the first position of the slide and the second state corresponds to the second position of the slide.

The threshold valve is thus configured to make the slide pass from its first position to its second position when the pressure value of the fluid under pressure in the pressure chamber of the parking brake is less than a predetermined threshold value. More particularly, the triggering of the threshold valve enables the venting of the pressure chamber of the parking brake and thus the passage of the latter into working configuration to block the braking piston of the service brake.

It should be noted that a pressure drop is detected here in the pressure chamber of the parking brake since it is considered that such a pressure drop signifies a pressure drop in the pressure chamber of the service brake. To be precise, if there are leakages at the pressure chamber of the parking brake, there are also leakages from the pressure chamber of the service brake.

The use of such a threshold valve is particularly advantageous since, after the application of the service brake (as described with reference to FIG. 2) leakages could slowly vent the service brake pressure chamber and the pressure chamber of the parking brake, without the parking brake being applied.

Thus, the threshold valve makes it possible to avoid this situation since the switching of the slide enables the application of the parking brake as soon as the pressure of the fluid in the parking brake pressure chamber is less than the predetermined threshold value of pressure (and thus as soon as the pressure of the fluid in the service brake pressure chamber has dropped significantly).

It will be noted that the actuator of the distributor is in this case connected to the brake secondary pipe via an actuating pipe, for the movement of the slide on triggering of the threshold valve.

In other variants not illustrated:
- in the resetting configuration of the rail vehicle braking system, the operation of resetting is carried out electrically or mechanically or hydraulically rather than pneumatically;
- in the unlocking configuration of the rail vehicle braking system, the unlocking part is held in an unlocking position of the parking brake by a lock that is pneumatic, electric or mechanical;
- in the unlocking configuration of the rail vehicle braking system, the unlocking command is carried out manually through the use of at least one cable, or pneumatically, electrically or hydraulically;
- the unlocking configuration of the rail vehicle braking system is obtained by supplying the parking brake pressure chamber, as for the resetting configuration rather than by the actuation of an unlocking part;
- the service brake pressure chamber may be vented deliberately rather than by the leakages of the system;
- the blocking devices and ratchet wheels and/or piston rods of the systems illustrated in FIGS. 1 to 5 and 6 to 9 may have teeth formations such as those illustrated on the blocking devices and ratchet wheels illustrated in FIGS. 10 to 11;
- in the locking configuration, the actuation of the blocking device may be carried out by an electrical actuator 525 as shown on FIG. 16 rather than by the pressurization of a pressure chamber supplied by a distributor;
- the rail vehicle braking system lacks any regulator between the auxiliary reservoir and the service brake pressure chamber and/or lacks any auxiliary reservoir and/or the first and second sources of pneumatic pressure agent are totally separate rather than coming from the same main pipe;
- the rail vehicle braking system comprises a service brake lacking a wedge part attached to the braking piston, such that this piston acts directly on the thrust rod, which acts on the deformable levers; and in that case, the braking piston together with its notched rod and the thrust rod are movable in the second axial direction whereas the parking brake is configured such that the blocking finger and the holding piston are movable in the first axial direction;
- the rail vehicle braking system has a braking linkage different from that illustrated in the Figures, in particular the braking linkage comprises a block configured to act directly on a wheel of the rail vehicle, that block being directly jointed by a pivot type joint fastened to the thrust rod, a rigid lever fastened to the body of the system as well as a deformable lever fastened both to the rigid lever and to the joint on the block; and/or
- the rail vehicle braking system comprises a braking linkage configured to act on a brake having blocks as described above and is provided with a service brake with or without a wedge part attached to the braking piston.

It should be noted more generally that the invention is not limited to the examples described and represented.

The invention claimed is:

1. A rail vehicle braking system with brakes that have at least one lining or at least one block (5), comprising:
   a body (2; 102; 202; 302; 402);
   a braking linkage (4) configured to act on at least one said brake that has at least one lining or at least one block (5);
   a service brake (6) comprising a braking piston (8; 108; 408) which is movable relative to said body to act on said braking linkage (4) and delimits with said body a service brake pressure chamber (13; 113; 413) configured to be supplied by a first source of pneumatic pressure agent (50, 51, 53) to put said braking piston into a service braking position; and
   a parking brake (7) configured to act on said braking piston of said service brake and having a working configuration and a resting configuration, wherein,
   said braking piston is disposed in said body and has two sides, respectively a first side (17; 117) configured to act on said braking linkage (4) and a second side (18; 118) which is an opposite side to said first side and which is turned towards said service brake pressure chamber,
   said service brake further comprises a piston rod (21; 121; 221; 321; 421) disposed in said service brake pressure chamber and attached to said second side of said braking piston,
   said parking brake is disposed in said body and comprises a blocking device (20; 120; 220; 320; 420) disposed in said service brake pressure chamber, which blocking device is movable relative to said body to act on said piston rod and having a first position and a second position, as well as an actuating device (23, 24; 123, 124, 180; 223, 280; 323, 380; 423, 424) which is movable relative to said body, the actuating device being configured to be electrically actuated and having a stable position, and
   said blocking device and said actuating device is configured such that:
   with said braking piston in the service braking position and said parking brake is in working configuration, said actuating device acts on said blocking device until the latter immobilizes said piston rod so as to block said braking piston in the service braking position, said blocking device then being in the second position and said actuating device in the stable position, and
   with said parking brake in resting configuration, said actuating device acts on said blocking device until the latter frees said piston rod so as to unblock said braking piston from the service braking position, said blocking device thus being in the first position, whereby the braking force applied to said braking linkage when said parking brake is in working configuration is directly related to the braking force applied to said braking linkage by said service brake in the service braking position, independently of the force applied by said blocking device on said piston rod.

2. The system according to claim 1, wherein said actuating device is formed by an electrical actuator.

3. The system according to claim 1, wherein said blocking device (120; 220; 320; 420) is disposed in a cavity (134; 234; 334; 434) of said body (102; 202; 302; 402).

4. The system according to claim 1, wherein said blocking device is formed by a blocking finger (20; 120; 220; 320; 420) and said actuating device is formed by an electrical actuator movable relative to said body and by a spring member (24; 124, 180; 280; 380; 424); said electrical actuator being configured to hold said blocking finger in the first position when said electrical actuator is electrically supplied, in which first position said blocking finger is away from said piston rod; said spring member being configured to hold said blocking finger in the second position when said electrical actuator is not electrically supplied, in which second position said blocking finger immobilizes said piston rod.

5. The system according to claim 1, wherein said blocking device is formed by a blocking finger (20; 120; 220; 320; 420) and said actuating device is formed by an electrical actuator movable relative to said body; said electrical actuator being configured to hold said blocking finger in the first position when said electrical actuator is electrically supplied, in which first position said blocking finger is away from said piston rod; said electrical actuator being further configured to hold said blocking finger in the second position when said electrical actuator is not electrically supplied, in which second position said blocking finger immobilizes said piston rod.

6. The system according to claim 4, wherein said spring member (180; 280; 380) is disposed in a cavity (134; 234; 334) of said body (102; 202; 302).

7. The system according to claim 1, wherein said parking brake further comprises an intermediate actuating lever (147; 247) attached both to said blocking device (120; 220) and to said actuating device (123; 223) and configured to actuate said blocking device in response to the movement of said actuating device.

8. The system according to claim 1, wherein said blocking device (20; 120; 220) has at a distal end a tooth having at least one inclined edge (175; 275) and configured to cooperate in complementary manner with a complementary teeth formation having at least one inclined edge (76; 176; 276; 476) of said piston rod (21; 221) or of an intermediate part (146; 446) disposed between said piston rod (21; 221) and said blocking device (20; 120; 220).

9. The system according to claim 1, wherein said blocking device (320) has at a distal end a tooth having straight edges (375) and configured to cooperate in complementary manner with a complementary teeth formation having straight edges (376) of said piston rod or of an intermediate part (346) disposed between said piston rod and said blocking device (320).

10. The system according to claim 1, wherein said service brake further comprises a ratchet wheel (146; 246; 346; 446) mounted on said piston rod (121; 421) and configured to mesh with said blocking device (120; 220; 320; 420) when the latter is in the second position, in order to immobilize said piston rod.

11. The system according to claim 1, wherein said parking brake (7) further comprises a unlocking part (29; 429) for unlocking said parking brake when the latter is in working configuration, which unlocking part is configured to act on said blocking device (20; 420).

12. The system according to claim 11, wherein said unlocking part is configured to be electrically actuated.

* * * * *